United States Patent
Pachys

(10) Patent No.: US 11,512,760 B2
(45) Date of Patent: Nov. 29, 2022

(54) SWIVEL HOOK WITH CLOCKWISE AND ANTICLOCKWISE MAGNETIC ROTATION DAMPING

(71) Applicant: Freddy Pachys, Kibbutz Nachshon (IL)

(72) Inventor: Freddy Pachys, Kibbutz Nachshon (IL)

( * ) Notice: Subject to any disclaimer, the term of this patent is extended or adjusted under 35 U.S.C. 154(b) by 41 days.

(21) Appl. No.: 17/130,024

(22) Filed: Dec. 22, 2020

(65) Prior Publication Data

US 2022/0196114 A1 Jun. 23, 2022

(51) Int. Cl.
*B66C 1/34* (2006.01)
*F16F 15/18* (2006.01)
*B66C 13/04* (2006.01)

(52) U.S. Cl.
CPC ............. *F16F 15/18* (2013.01); *B66C 1/34* (2013.01); *B66C 13/04* (2013.01); *F16F 2222/06* (2013.01)

(58) Field of Classification Search
CPC ... B66C 1/34; B66C 1/66; B66C 13/04; F16F 15/18; F16F 2222/06; B64D 1/22; F16G 15/08
USPC .......................................... 294/82.11, 82.15
See application file for complete search history.

(56) References Cited

U.S. PATENT DOCUMENTS

| | | | | |
|---|---|---|---|---|
| 2,433,938 A * | 1/1948 | Varner | .................. | H01R 39/00 191/1 R |
| 2,447,343 A * | 8/1948 | Kelly | ........................ | B66C 1/34 294/82.15 |
| 8,087,844 B2 * | 1/2012 | Turner | .................. | A01K 91/04 403/DIG. 1 |
| 10,150,565 B2 * | 12/2018 | Stucki | .................... | F16M 13/02 |
| 2010/0259121 A1 * | 10/2010 | Ueda | ....................... | F16D 27/01 310/103 |
| 2021/0139291 A1 * | 5/2021 | Sundar S Iyer | ........ | B66C 13/04 |

* cited by examiner

*Primary Examiner* — Dean J Kramer
(74) *Attorney, Agent, or Firm* — Mark M. Friedman

(57) ABSTRACT

A swivel device with rotation damping, adapted to rotationally couple a hoist cable to a hoist hook, the device including: a first disc fixedly mounted on a central axle and adapted to be operationally coupled to a distal end of the cable by a non-rotating coupling; a second disc rotationally mounted on the central axle and spaced apart from the first disc, the second disc adapted to be operationally coupled to the hoist hook by a non-rotating coupling; a first set of magnets mounted on the first disc; and a second set of magnets mounted on the second disc, magnetic fields of the first set of magnets interacting with magnetic fields of the second set of magnets to damp rotation of the second disc about the central axle.

14 Claims, 6 Drawing Sheets

SWIVEL HOOK WITH CLOCKWISE AND ANTICLOCKWISE MAGNETIC ROTATION DAMPING

FIELD OF THE INVENTION

The present invention relates to a rotation damping mechanism for a swivel and, more particularly, to a magnetic damping mechanism for a swivel device, such a rescue swivel hook.

BACKGROUND OF THE INVENTION

Rescue helicopters have a hoist apparatus for airlifting trapped and/or injured people or animals. Injured people are placed in a rescue stretcher and secured to the swivel hoist hook. It is a common enough occurrence for the stretcher to start spinning once it has been lifted off the ground, often due to tailwinds and/or downdraughts from the helicopter itself.

While the spinning stretcher occurrence is well known in the rescue field, to date, there is no satisfactory mechanism or procedure to prevent the spinning payload or to rectify a spin once it has begun.

SUMMARY OF THE INVENTION

According to the present invention there is provided a swivel device with rotation damping, adapted to rotationally couple a hoist cable to a hoist hook, the device including: a first disc fixedly mounted on a central axle and adapted to be operationally coupled to a distal end of the cable by a non-rotating coupling; a second disc rotationally mounted on said central axle and spaced apart from said first disc, said second disc adapted to be operationally coupled to the hoist hook by a non-rotating coupling; a first set of magnets mounted on said first disc; and a second set of magnets mounted on said second disc, magnetic fields of said first set of magnets interacting with magnetic fields of said second set of magnets to damp rotation of said second disc about said central axle.

According to further features in preferred embodiments of the invention described below the first disc is mechanically coupled to a cable-side hub and said second disc is mechanically coupled to a hook-side hub, said central axle running centrally through central apertures of said first and second discs, said cable-side and hook-side hubs; and wherein said cable-side hub is fixedly coupled to said axle and said hook-side hub is rotationally coupled to said axle.

According to still further features in the described preferred embodiments the first and second discs have similar dimensions and said first set of magnets is arranged in corresponding positions to said second set of magnets.

According to still further features magnets of said first set of magnets are populated on an underside of said first disc and magnets of said second set of magnets are populated on an upper side of said second disc.

According to still further features the magnets of said first set of magnets are disposed at equal intervals about a periphery of said first disc and said magnets of said second set of magnets are disposed at equal intervals about a periphery of said second disc.

According to still further features magnetic poles of said first set of magnets face same or opposite magnetic poles of said second set of magnets.

According to still further features a portion of magnetic poles of said first set of magnets face same magnetic poles of a portion of said second set of magnets and vice versa.

According to still further features at least a portion of magnets in said first and second set of magnets are electromagnets.

According to still further features at least a portion of magnets in said first and second set of magnets are electropermanent magnets.

According to still further features a number of magnets in said first set of magnets is different from a number of magnets in said second set of magnets.

According to still further features a strength of magnets in said first set of magnets is different from a strength of magnets in said second set of magnets.

According to another embodiment there is provided a swivel device with rotation damping, adapted to rotationally couple a hoist cable to a hoist hook, the device including: a first disc adapted to be operationally coupled to a distal end of the cable by a non-rotating coupling; a second disc spaced apart from said first disc, said second disc adapted to be operationally coupled to the hoist hook by a non-rotating coupling; wherein said first disc is rotationally coupled to said second disc such that said second disc is adapted to swivel about an axis common to said first and second discs and said first disc adapted to not swivel about said axis; a first set of magnets mounted on said first disc; and a second set of magnets mounted on said second disc, magnetic fields of said first set of magnets interacting with magnetic fields of said second set of magnets to damp rotation of said second disc about said central axle.

According to still further features the device further including an axle extending through central apertures of said first disc and said second disc, wherein said first disc is fixedly coupled to said axle and said second disc is rotationally coupled to said axle.

According to still further features the first disc is mechanically coupled to a cable-side hub and said second disc is mechanically coupled to a hook-side hub, said axle running centrally through said cable-side and hook-side hubs and wherein said cable-side hub is fixedly coupled to said axle and said hook-side hub is rotationally coupled to said axle.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a swivel device with rotation damping coupling a cable to a hoist hook according to the present invention may be better understood with reference to the drawings and the accompanying description.

Many helicopters include a cable hoist system that allows hovering helicopters to lower or raise cargo or personnel from the helicopter door. A wide range of military helicopters use the hoist system to rescue or extract forces from the ground while keeping the helicopter safely airborne. Rescue services similarly use the hoist system to extract stranded and/or injured people. The hoist system includes a winch and cable. The cable is attached to a hoist hook via a swivel mechanism. The payload (e.g. one or more people, objects, a stretcher, etc.) is attached to the hoist hook. If the payload spins, the legacy swivel mechanism ensures that the cable coupled to the winch does not twist, as that can damage the cable and/or winch mechanism. The instant innovative swivel mechanism protects the hoist cable while damping the rotation of the payload.

Figure 1:
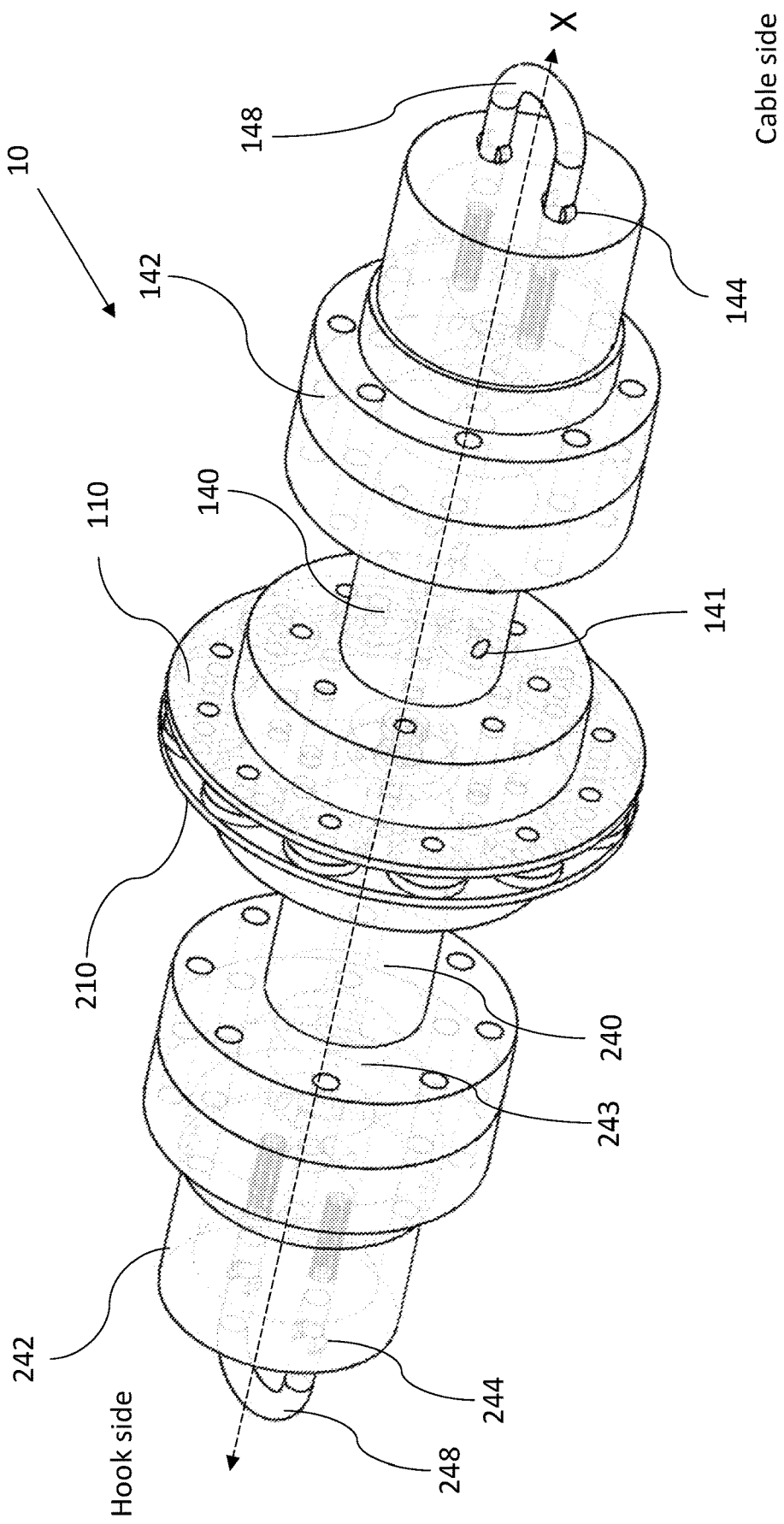
FIG. 1 is a swivel mechanism 10 with rotation damping which is adapted to couple a cable to a hoist hook.

Referring now to the drawings, FIG. 1 illustrates a swivel mechanism 10 with rotation damping which is adapted to couple a cable to a hoist hook. The mechanism is depicted without an external casing. The device 10 is depicted lying horizontally. However, in use, the device is suspended vertically connecting the hoist cable to the payload. Accordingly, one end of the device is coupled to the cable and the other end of the device is coupled to the hook. In the figures, the right hand side (in the depicted horizontal orientation) is the top side (in the vertical orientation). Therefore, hereafter, all the parts will be defined relative to the vertical orientation, and described, as best as possible, according to both the vertical and horizontal orientation unless such detail makes the description overly confusing and unclear.

The device 10 includes a first, top disc 110 (depicted on the right hand side of the midpoint of the apparatus in the figure) operationally coupled to a distal end of a cable (not shown) by a non-rotating coupling (not shown). A second, bottom disc 210 is spaced apart from the first disc 110 with a rod running through a center of the first disc 110 and the second disc 210, along an axis X. The central rod or axle is fixedly coupled to the right hand (top) side of the mechanism while the left hand (bottom) side of the mechanism is not fixed to the axle/rod. The swivel mechanism allows the second disc to freely rotate about the internal rod which is on the same axis (an axis X) as the cable. A hoist hook (not shown) is operationally coupled to the second disc 210 by a non-rotating coupling (not shown).

Each disc is mechanically coupled to a respective hub. Disc 110 is fastened to a hub 140, e.g. using nuts and bolts. Disc 210 is coupled to a hub 240 in a similar manner. The hubs each have a central channel in which the rod is disposed. The hubs have a similar structure with only minor distinctions. Otherwise, the hubs are identical in every other respect. Therefore, whatever description follows applies equally to both hubs, aside for the specific distinctions which will be pointed out hereafter.

The right hand hub 140 differs from the left hand hub 240 in that the right hand (top) hub is fixedly attached to the rod with screws that are threaded through holes 141. Furthermore, the left hand side, hub 240 has two bearings 243, one disposed on each end of the hub 240. The bearings minimize the friction between the axle and the hub, thereby minimizing the wear-and-tear of the apparatus. The right hub 140 does not have any bearings.

Each hub is connected (e.g. via bolts and nuts) on one end to a disc and on the other end to a cover piece 142, 242. The cover pieces 142, 242, on either end of the apparatus 10, can be outfitted with metal loops 148, 248 or similar pieces which are set in holes 144, 244. The cable attaches to metal loop 148 on the (top) right hand side of the swivel mechanism and the payload hook attaches to metal loop 248 on the left hand (bottom) side.

Figure 2:
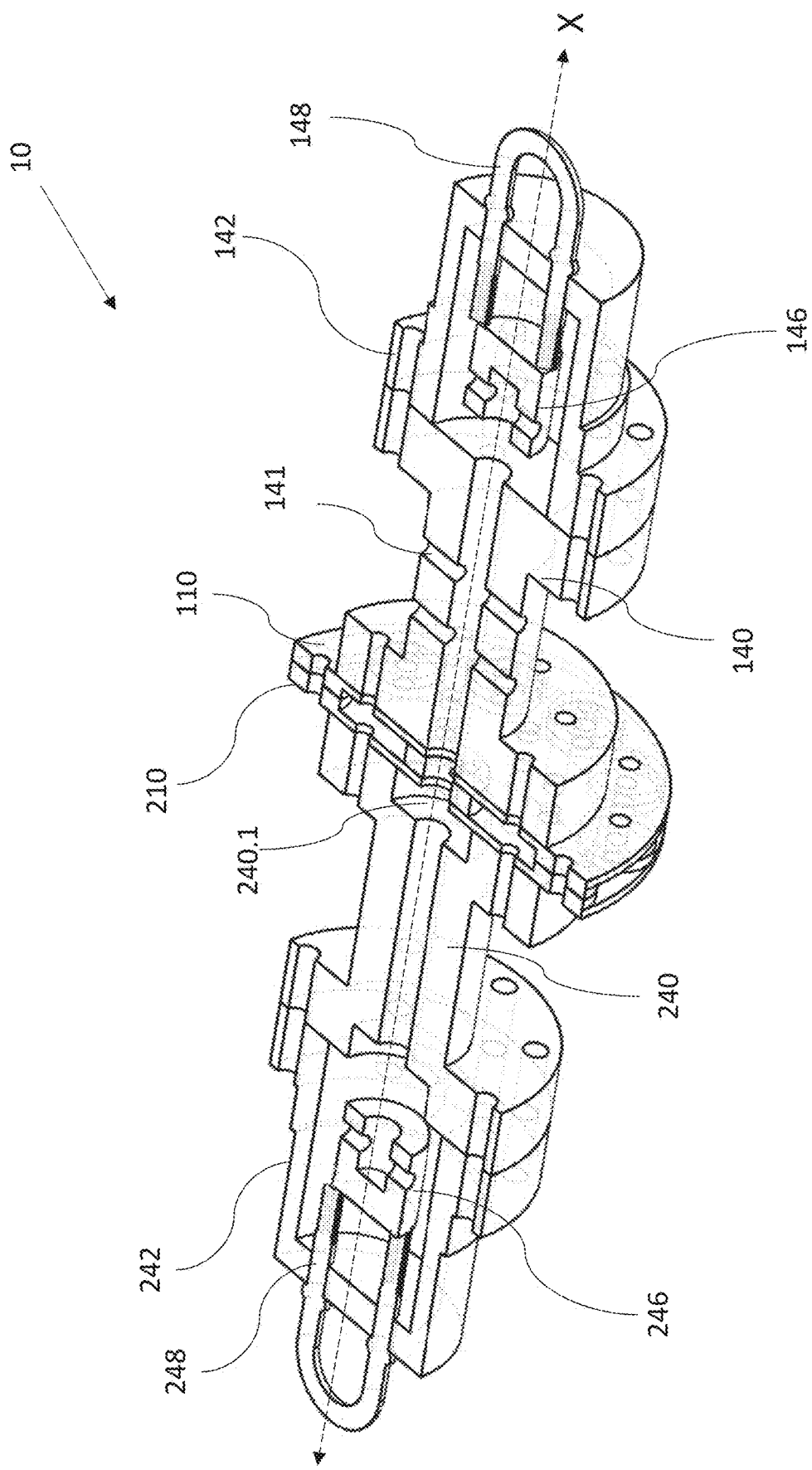
FIG. 2 is a cut-away view of the apparatus 10.

FIG. 2 is a cut-away view of the apparatus 10. The channel in which the axle lies is clearly visible (the axle is removed from the diagram). The channel is made up of apertures running through the various components of the apparatus, when all the components are aligned and mechanically coupled together. Internally, the rod or axle is enclosed on each end by a plug 146, 246. The axle has [male] threads on each end screws into the plugs 146, 246 which have corresponding [female] threads. The plugs ensure that all the parts on the left hand side do not slide off the axle. The plugs are discussed in further detail with regards to FIG. 6A-6C below.

Figure 3A:
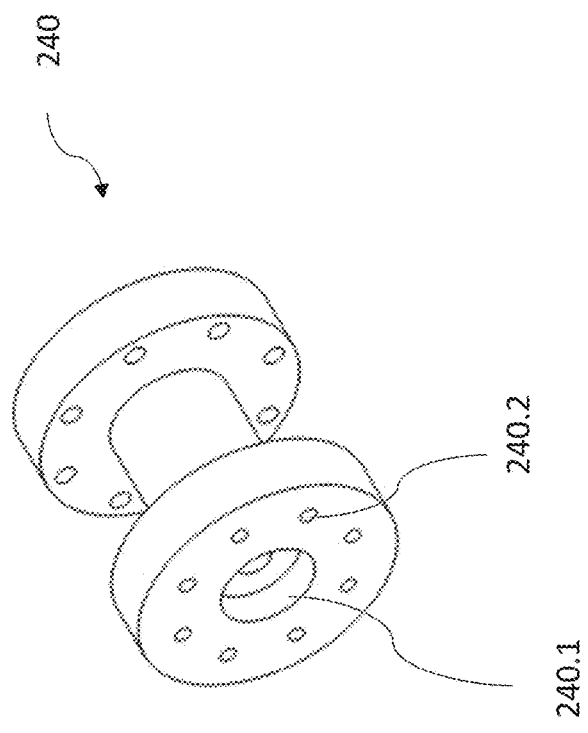
FIG. 3A is an isometric view of the right hub.
Figure 3B:
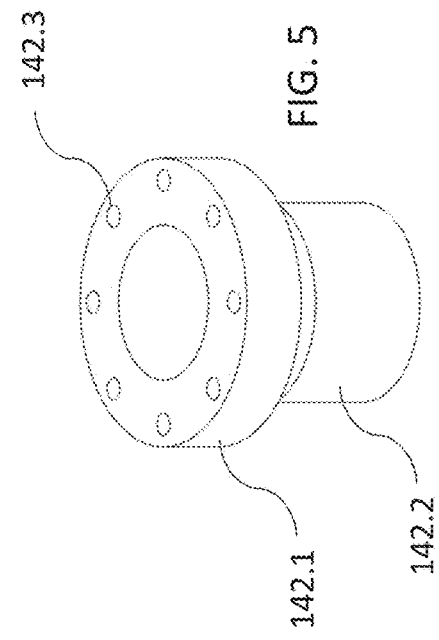
FIG. 3B is an isometric view of the left hub.

FIG. 3A is an isometric view of the right hub 140. FIG. 3B is an isometric view of the left hub 240. A circular section 240.1 is formed on each end of hub 240 and is shaped and sized to receive a bearing such as bearing NSK 6818VV made in Japan.

Figure 4:
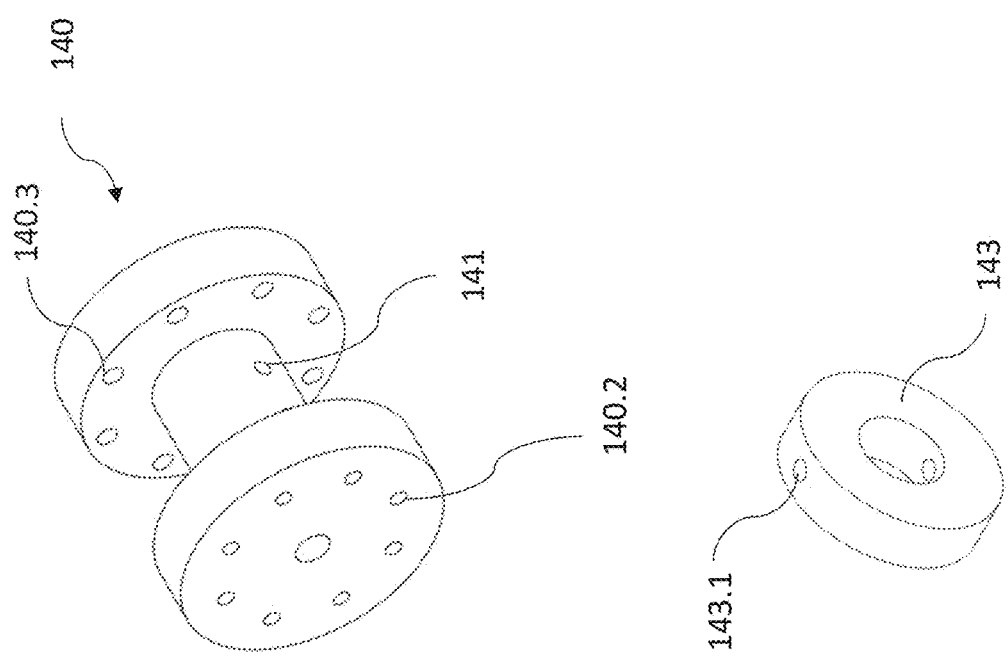
FIG. 4 is an isometric view of a bearing 143.

FIG. 4 is an isometric view of a spacer 143. The spacer is disposed between the first disc 110 and the second disc 210. Spacers of different thicknesses can be used to set the discs closer or farther away from each other. The closer the discs, the stronger the attraction/repulsion between the sets of magnets and vice versa.

Figure 5:
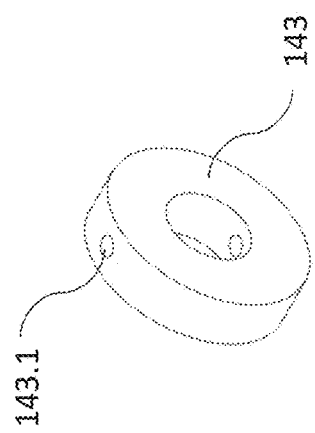
FIG. 5 is an isometric view of cover piece 142.

FIG. 5 is an isometric view of cover piece 142. The cover pieces on each end are identical, therefore the following description applies equally to the cover piece 242. The cover pieces 142, 242, on either end of the apparatus 10, can be outfitted with metal loops 148, 248 or similar pieces which are set in holes 144, 244 (see FIG. 1, 2 for best view). The cable attaches to one side of the swivel mechanism and the payload hook attaches to the other side. Of course, the connections could be integrated, with the cable attached integrally with the mechanism, at the top end, and the hook can be integrally attached to the bottom end of the mechanism. The cover piece 142 has a wide circular flange 142.1 and a narrower pipe section 142.2 which is closed at the distal end. The holes 144 is disposed in the closed end of the pipe section 142.2. The flange has bolt holes 142.3 which are aligned with bolt holes 140.3 of the hub 140.

Figure 6C:
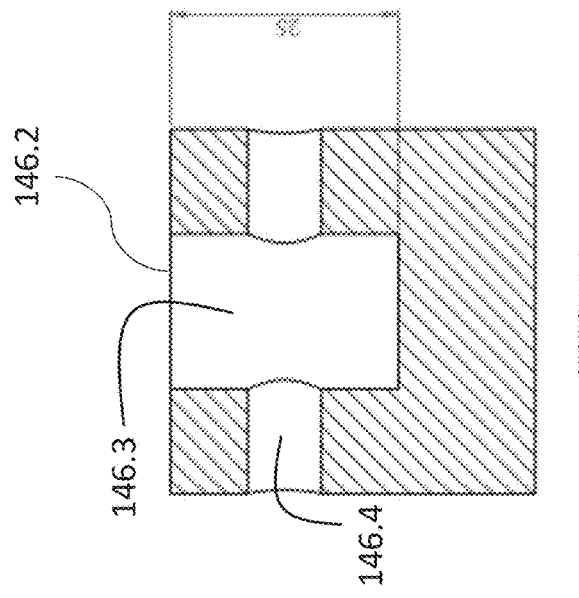
FIGS. 6A, 6B and 6C are various views of plug 146.
Figure 6A:
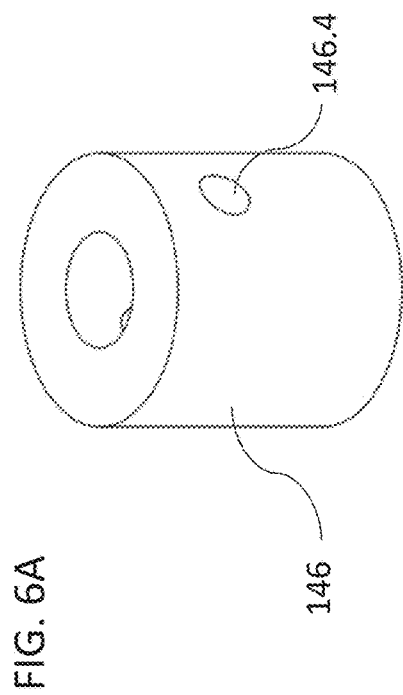
Figure 6B:
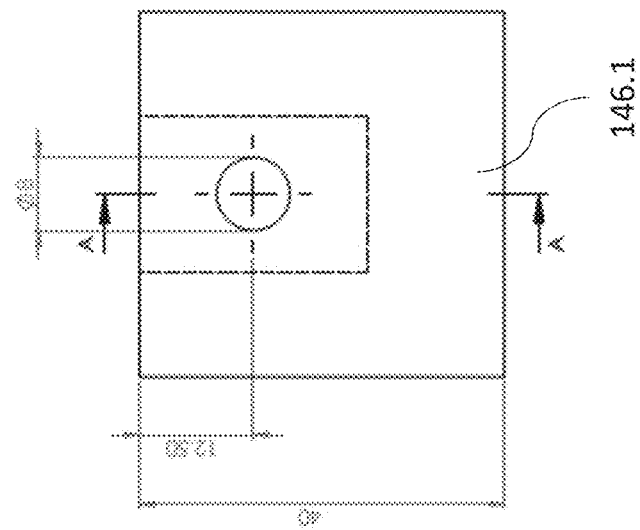

FIGS. 6A, 6B and 6C are various views of plug 146, 246. While the description hereafter refers to plug 146, it is made clear that the description applies equally to plug 246. FIG. 6A is an isometric view of plug 146. FIG. 6B is a schematic side view of the plug. FIG. 6C is a sectional view of section A-A of FIG. 6B. The plug has a closed end 146.1 and an open end 146.2 opposite the closed end. The ends of the axle are disposed within the inner volume 146.3 of the plug. The side walls that—together with the bottom wall—define inner volume 146.3 are threaded. The threading is not shown in the figures. The plug is screwed over the end of the axle and optionally secured to the axle with a bolt and nut, the bolt being threaded through screw holes 146.4 and corresponding holes on the axle. It is to be understood that the physical configuration of the hubs and cover pieces etc. are merely exemplary and that other configurations that serve a similar function can be used in place thereof. Furthermore, the housing for the axle that couples to the discs can molded as a single left piece and a single right piece, e.g. by an injection molding process or a 3-D printing process or the like. As such, the specific configurations of the hubs and cover pieces are not intended to be limiting in any way.

Figure 7A:
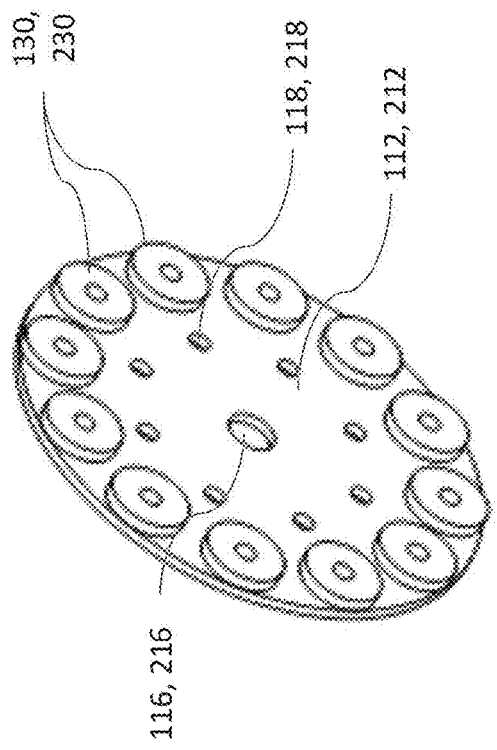
FIGS. 7A, 7B and 7C are various views of disc 110, 210.
Figure 7B:
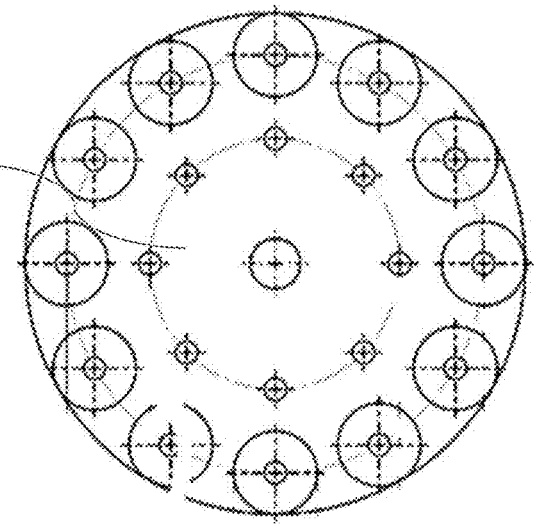
Figure 7C:
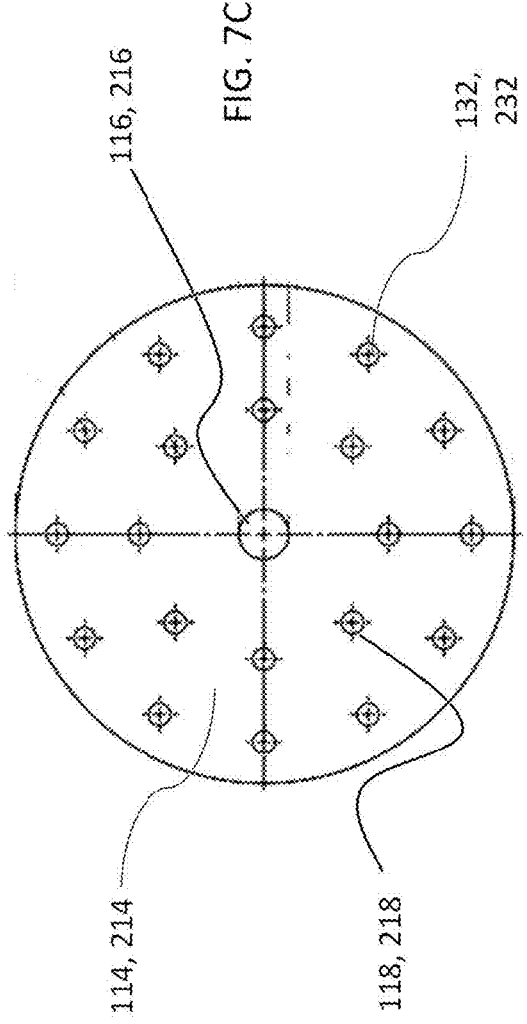

FIGS. 7A, 7B and 7C are various views of disc 110, 210. FIG. 7A is an isometric view of the disc 110, 210. FIG. 7B is a magnet side view of the disc 110, 210. FIG. 7C is a nut-side view of the disc 110, 210. The first disc 110 has a first set of magnets 130 mounted on a bottom, magnet-side, surface 112 of the disc, around the perimeter of the disc. The second disc 210 has a second set of magnets 230 mounted on the top, magnet-side surface 212 of the disc, around the perimeter of the disc. Nuts 132, 232 fastened on nut-side surfaces 114, 214 of the discs 110, 210 secure the magnets 130, 230 to the discs. Discs 110, 210 are mechanically coupled to the hubs 140, 240, using any coupling means known in the art, such as nuts and bolts, via bolt holes 118, 218 in the discs and corresponding bolt holes in the hubs 140.2, 240.2.

The magnetic fields of the first set of magnets 130 interact with the magnetic fields of the second set of magnets 230 to damp rotation of the second disc 210 about the central axle and axis X. The central rod/axle runs through apertures 116, 216.

Figure 8:
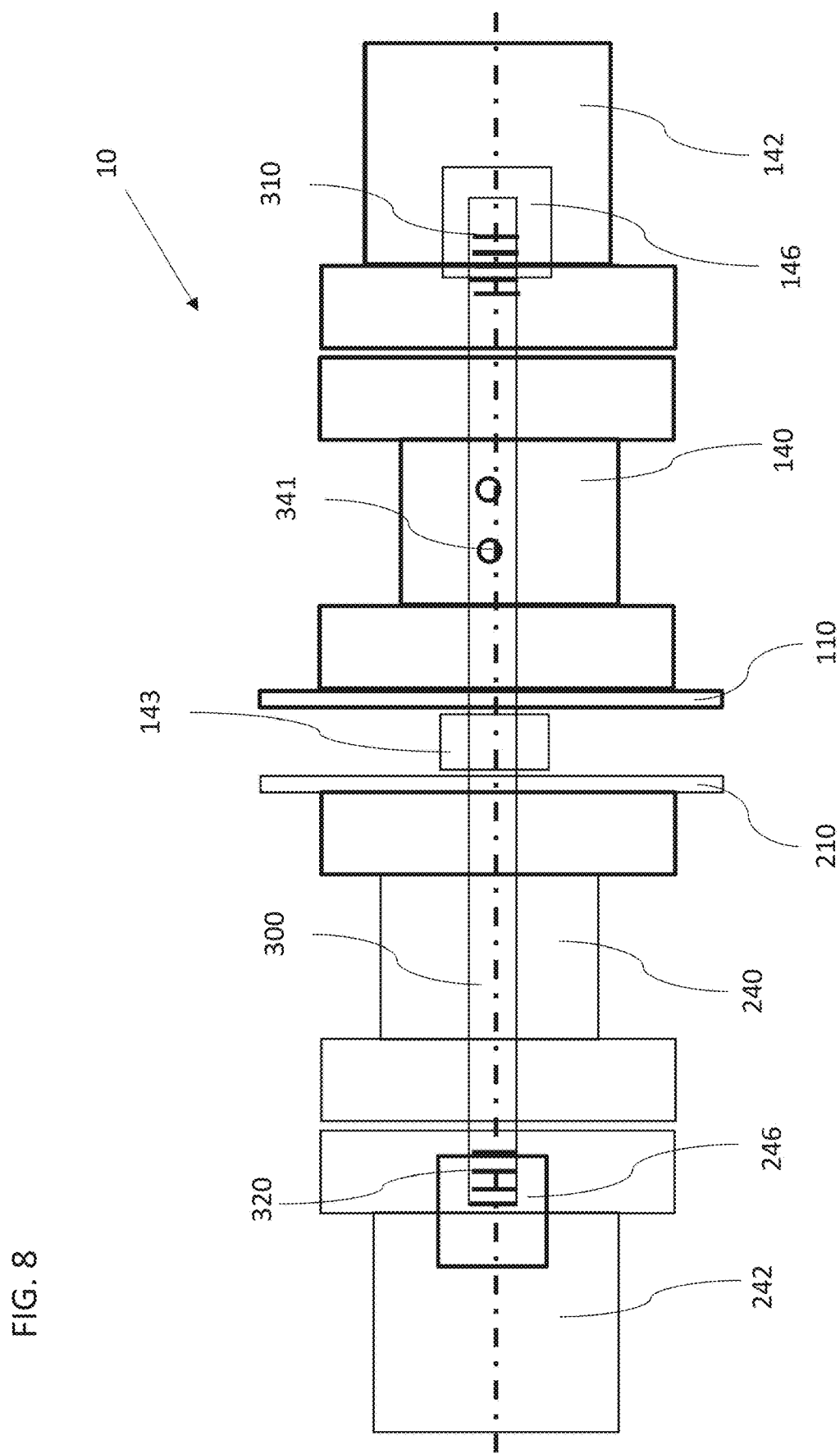
FIG. 8 is a schematic diagram of the assembled device 10.

FIG. 8 is a schematic diagram of the assembled device 10. Exemplarily, the device can be assembled from right to left as follows: loop 148 is fastened to cover piece 142 by inserting the threaded ends of the U-shaped loop through holes 144 and securing them with nuts. Rod/axle 300 has threaded ends 310, the right end of the rod is screwed into plug 146. It is desirable to coat the screw threads of the rod with adhesive to ensure that the rood does not come lose. Optionally, a bolt can be threaded through holes 146.4 and axle 300 to further secure the rod to the plug. Hub 140 is assembled onto rod 300 (like placing meat on a BBQ skewer) and the hub is attached to the rod via holes 141 (e.g. threading bolts through the holes 141 and corresponding holes 341 on the rod and securing the bolts with nuts on the other end). Plug 146 cannot pass into the internal channel of hub 140. Cover piece 142 is placed over plug 146 and bolted onto hub 140.

Disc 110 is next assembled onto rod 300 with the rod/axle going through the central aperture 116. The disc is bolted onto hub 140. Prior to assembly, the disc is prepared with preselected magnets 130 of the desired size, number and strength which are fastened to the disc (e.g. with nuts and bolts). The nut-side of the disc 110 is bolted to hub 140.

When a spacer is used (which is preferable), the spacer 143 is thread onto axle 300. The spacer 143 can be mechanically coupled to the axle with screws screwed into axle, or with a bolt running through the axle—via holes 143.1 in the spacer. At this point, the right-hand side of the device is completely assembled. The right-hand side of the device does not rotate around rod 300.

Next, disc 210 is threaded onto axle 300 via aperture 216 with magnets 230 facing the spacer Like disc 110, bottom disc 210 is preassembled with the selected number of magnets of the predetermined size and strength according to the predetermined configuration. Bearing as inserted into circular cut-outs 240.1 on each side of hub 240. Hub 240 is loaded onto axle 300 and bolted (or otherwise mechanically coupled) to disc 210. Plug 246 is screwed onto the threaded end 320 of axle 300, securing the left side of the assembly on the axle while allowing the left side to rotated freely about the axle. As with plug 146, it is preferred that an adhesive is applied to the threads of the axle and the plug can optionally be bolted onto the axle via the bolt holes in plug 246. Loop 248 is securely attached to cover piece 242. Cover piece 242 is placed over the plug and bolted or otherwise secured to hub 240. The device is now fully assembled and ready for use. In some embodiments, two external housing pieces (not shown) cover the right- and left-hand sides of the device respectively.

Damping the rotation of the payload can be very helpful in controlling the spin of the payload. The payload can spin clockwise or counterclockwise. The magnetic damping provided by the instant device reduces spin regardless of the direction. A proficient pilot can maneuver the helicopter to compensate for the spin and minimize the tail wind/down draught that causes the spin of the payload in the first place. The combination of the magnetic damping of rotation and proficient flying skills can prevent harm and/or damage to the payload.

The attraction or repulsion of the magnets hinders the swivel of the bottom disc relative to the top disc and hence the cable. A balance must be reached between the damping power of the magnets and ability of the payload to rotate: if there is insufficient damping power, the payload can still spin uncontrollably and possibly damage the people/objects making up the payload; if the damping power is too great, the swivel mechanism will fail to prevent the torque from the spinning payload from translating to the cable, and the cable will rotate and get damaged (likely damaging the winch as well).

In order to find the aforementioned balance, the strength and/or number of magnets is calculated for maximum efficiency. The mechanism is versatile in that the number, size and positions of the magnets can be changed according to need, upscaling for increased strength and downscaling to reduce magnetic strength. Furthermore, the distance between the discs can also be changed (e.g. by using spacers of different thicknesses, as mentioned elsewhere). The magnets are positioned at regular intervals, such that each intersection between magnetic fields of the magnets on opposing disc (i.e. when the magnets facing each other are aligned) acts as a mini-brake to the rotating disc. The repelling or attracting magnetic force between the individual pairs of facing magnets acts like a mechanical impediment that must be overcome in order for the bottom disc (second disc coupled to the payload and lacking any other counter-rotational resistance to the rotation of the payload) to rotate relative to the top disc (first disc that is coupled to the cable whose length, thickness and connection to the winch provide a counter-rotation force to the rotation of the bottom disc).

If the magnetic fields are too strong (both the individual strength of each magnet and the cumulative strength of all the magnets together) the torque from the rotating payload will not be dissipated at the swivel mechanism but rather transferred to the top disc and up the cable. If the magnetic strength is not strong enough, the rotational force will easily overcome the magnetic resistance and the rotation will not be damped to a significant or sufficient degree. Therefore, the strength of the magnetic resistance is calculated against the counter-rotational force brought to bear on the top (first) disc by the cable and winch.

According to one configuration, magnetic poles of the first set of magnets face same magnetic poles of the second set of magnets. Either positive to positive or negative to negative. Either way, the magnets repel each other, creating a magnetic resistance that needs to be overcome in order for the bottom (second) disc to rotate without causing the top disc to rotate as well. As mentioned, if the resistance is too strong, the bottom disc will cause the top (first) disc to rotate as well, rendering the swivel mechanism useless.

According to an alternative configuration, the magnetic poles of the first set of magnets face the opposite magnetic poles of the second set of magnets, i.e. positive to negative or negative to positive. As a result, when the top and bottom magnets are aligned, the magnetic attraction between the magnets provides the resistive force that needs to be overcome to "break" the magnetic connection between the opposingly positioned magnets. There is preferably no physical contact between the magnets so that they do not rub against each other and damage each other.

In yet another configuration, a portion of magnetic poles of the first set of magnets face same magnetic poles of a portion of the second set of magnets and vice versa, i.e. a remainder of magnets of the first set of magnets face opposite magnetic poles of a remainder of magnets of the second set of magnets. The magnets of both discs would need to be alternatively positive and negative.

One preferable feature is the ability to nullify magnetic damping resistance by turning off the magnetism. This can be done either partially or completely. Nullifying the magnetism of a portion of the magnets reduces the magnetic resistance. Nullifying the magnetism of all the magnets transforms the rotation damping swivel mechanism into a regular (undamped) swivel mechanism. In order to achieve the aforementioned functionality, at least a portion (i.e. some or all) of the magnets in the first set and/or second set of magnets are electromagnets. The magnetic field of an electromagnet is nullified by turning off the electric current magnetizing the magnet. A controller for controlling electric current to the magnets can be provided inside the helicopter for operation by the winch operator or another crew member (e.g. pilot or co-pilot). The control is in electrical communication with the magnets.

In some embodiments, at least a portion of magnets in the first and/or second set of magnets are electropermanent magnets. All of the aforementioned details regarding the electromagnets apply similarly, mutatis mutandis, to the electropermanent magnets.

While a number of configurations have been discussed above, it is made clear that these configurations, while preferred, are merely exemplary and that any configuration of the magnets is considered to be within the scope of the innovation. As such, it is made clear that the number of magnets can be increased or reduced from that which is discussed above and depicted in the Figures. Furthermore, the number of magnets on each of the discs does not need to be equivalent, e.g. there can be five magnets on disc 110 and only three magnets on disc 210. Still further, the spaces between the magnets described above and depicted in the figures is merely exemplary and it is made clear that the spaces and/or intervals between the magnets can be different therefrom. Still further, the strength of the magnetic fields of the magnets of the different discs may or may not be different. Still further, the space between the discs can be changed, to be closer together or farther apart.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A swivel device with rotation damping, adapted to rotationally couple a hoist cable to a hoist hook, the device comprising:
    a first disc fixedly mounted on a central axle and adapted to be operationally coupled to a distal end of the cable by a non-rotating coupling;
    a second disc rotationally mounted on said central axle and spaced apart from said first disc, said second disc adapted to be operationally coupled to the hoist hook by a non-rotating coupling;
    a first set of magnets mounted on said first disc; and
    a second set of magnets mounted on said second disc, magnetic fields of said first set of magnets interacting with magnetic fields of said second set of magnets to damp rotation of said second disc about said central axle.

2. The device of claim 1, wherein said first disc is mechanically coupled to a cable-side hub and said second disc is mechanically coupled to a hook-side hub, said central axle running centrally through central apertures of said first and second discs, said cable-side and hook-side hubs; and
    wherein said cable-side hub is fixedly coupled to said axle and said hook-side hub is rotationally coupled to said axle.

3. The device of claim 1, wherein said first and second discs have similar dimensions and said first set of magnets is arranged in corresponding positions to said second set of magnets.

4. The device of claim 1, wherein magnets of said first set of magnets are populated on an underside of said first disc and magnets of said second set of magnets are populated on an upper side of said second disc.

5. The device of claim 4, wherein said magnets of said first set of magnets are disposed at equal intervals about a periphery of said first disc and said magnets of said second set of magnets are disposed at equal intervals about a periphery of said second disc.

6. The device of claim 1, wherein magnetic poles of said first set of magnets face same magnetic poles of said second set of magnets.

7. The device of claim 1, wherein magnetic poles of said first set of magnets face opposite magnetic poles of said second set of magnets.

8. The device of claim 1, wherein a portion of magnetic poles of said first set of magnets face same magnetic poles of a portion of said second set of magnets and vice versa.

9. The device of claim 1, wherein at least a portion of magnets in said first and second set of magnets are electromagnets.

10. The device of claim 1, wherein at least a portion of magnets in said first and second set of magnets are electropermanent magnets.

11. The device of claim 1, wherein a number of magnets in said first set of magnets is different from a number of magnets in said second set of magnets.

12. The device of claim 1, wherein a strength of magnets in said first set of magnets is different from a strength of magnets in said second set of magnets.

13. A swivel device with rotation damping, adapted to rotationally couple a hoist cable to a hoist hook, the device comprising:
    a first disc adapted to be operationally coupled to a distal end of the cable by a non-rotating coupling;
    a second disc spaced apart from said first disc, said second disc adapted to be operationally coupled to the hoist hook by a non-rotating coupling;
    wherein said first disc is rotationally coupled to said second disc such that said second disc is adapted to swivel about an axis common to said first and second discs and said first disc adapted to not swivel about said axis;
    a first set of magnets mounted on said first disc; and
    a second set of magnets mounted on said second disc, magnetic fields of said first set of magnets interacting with magnetic fields of said second set of magnets to damp rotation of said second disc about said central axle; and an axle extending through central apertures of said first disc and said second disc, wherein said first disc is fixedly coupled to said axle and said second disc is rotationally coupled to said axle.

14. The device of claim 13 wherein said first disc is mechanically coupled to a cable-side hub and said second disc is mechanically coupled to a hook-side hub, said axle running centrally through said cable-side and hook-side hubs and wherein said cable-side hub is fixedly coupled to said axle and said hook-side hub is rotationally coupled to said axle.

* * * * *